United States Patent [19]
White

[11] 3,774,779
[45] Nov. 27, 1973

[54] HIGH SPEED UNSCRAMBLER FOR BAR FEEDERS
[75] Inventor: Frank F. White, Shaker Heights, Ohio
[73] Assignee: Automation Development Corporation, Mentor, Ohio
[22] Filed: Nov. 15, 1971
[21] Appl. No.: 198,919

[52] U.S. Cl. ............... 214/1 P, 214/1 PB, 214/152
[51] Int. Cl. ........................................... B65g 65/02
[58] Field of Search ........................ 221/161, 159; 214/1 P, 1 PB, 152

[56] References Cited
UNITED STATES PATENTS
3,506,142 4/1970 White .................................. 214/1 P
992,899 5/1911 Perkins ................................ 221/161
1,135,133 4/1915 Pacheco ........................... 214/1 P X
2,525,305 10/1950 Lombard ......................... 214/1 P X
3,308,968 3/1967 Harrington ....................... 214/1 PB
3,604,563 9/1971 Ronan, Jr. ........................ 214/1 P X Primary Examiner—Gerald M. Forlenza
Assistant Examiner—Frank E. Werner
Attorney—Bosworth, Sessions & McCoy

[57] ABSTRACT

An unscrambling process and apparatus for rapidly loading bars from a bundle to the storage ramp of a bar feeder employs slings for raising and lowering the bundle to orient the bars and has guide means above the storage ramp to form a single row on the ramp while permitting at least several bars to enter the ramp each time the slings are raised. Any interfering bar remaining near the open entrance side of the ramp is thrown over the remaining bars carried by the slings at a predetermined time in the cycle. This prevents jamming and permits reliable automatic feeding of the bars at a high rate far greater than that which could be achieved by previously known unscramblers.

24 Claims, 8 Drawing Figures

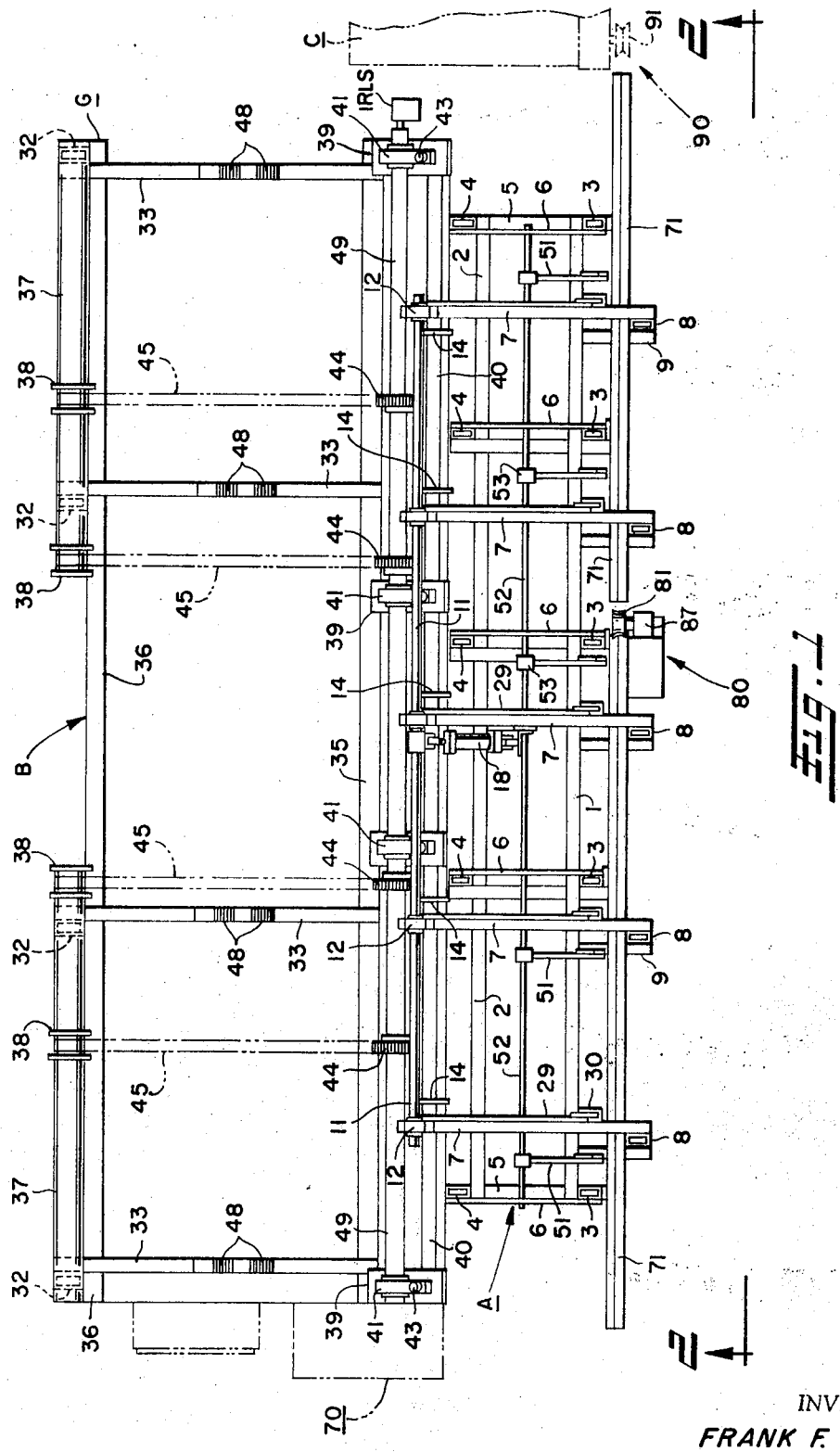

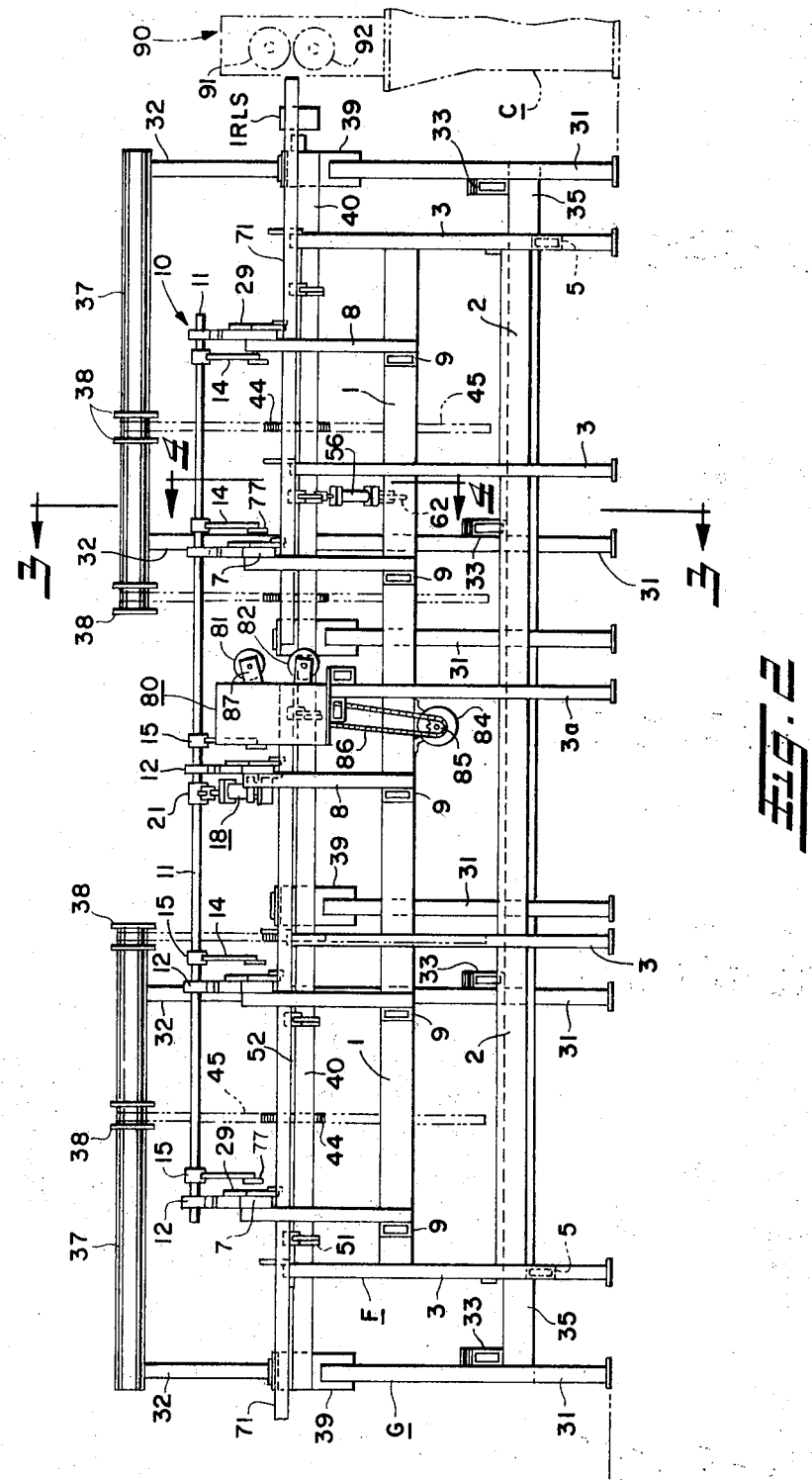

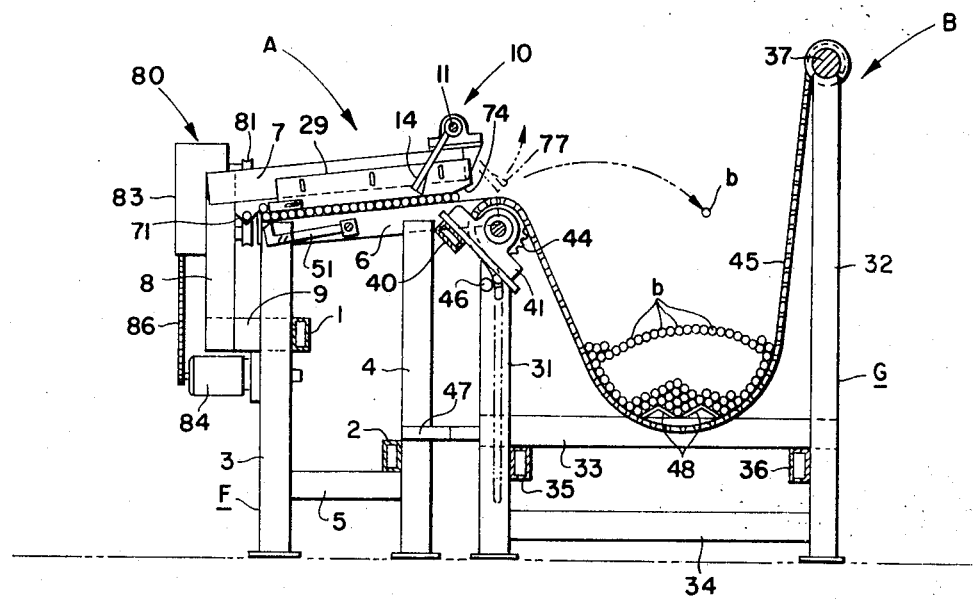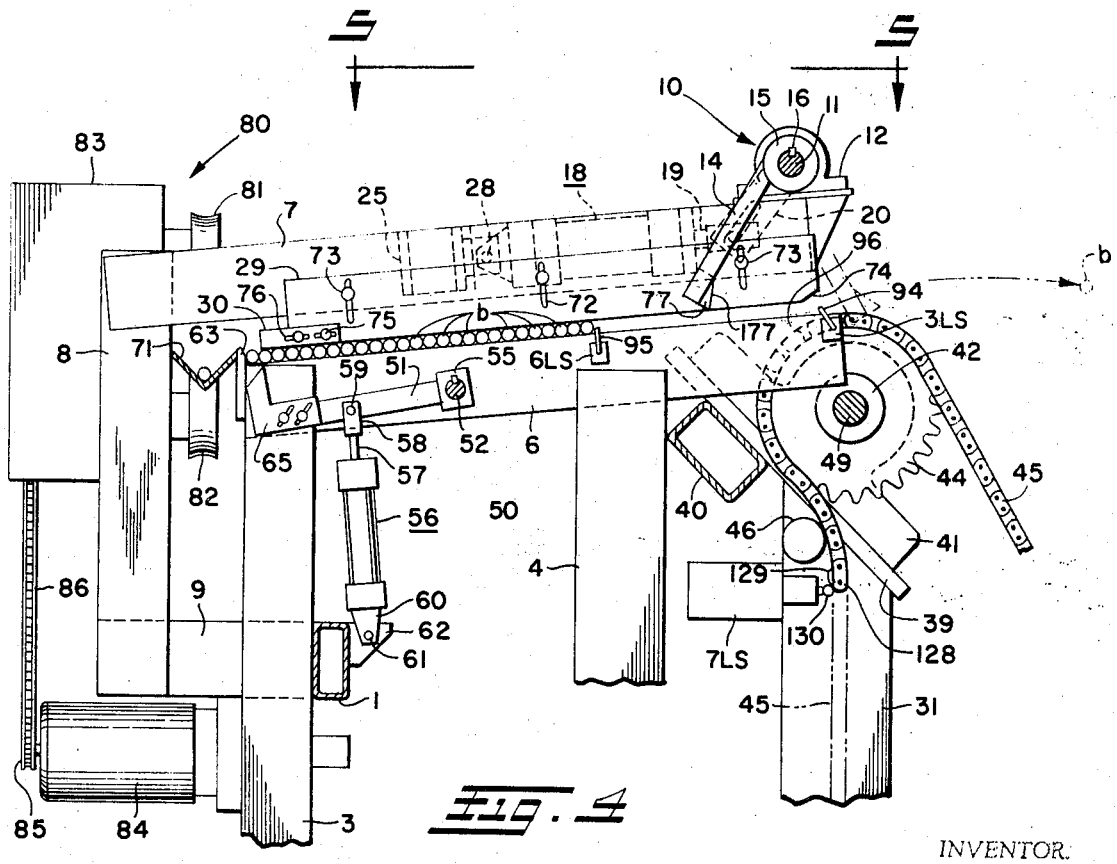

INVENTOR.
FRANK F. WHITE
BY
McCoy, Greene & Howell
ATTORNEYS

HIGH SPEED UNSCRAMBLER FOR BAR FEEDERS

The present invention relates to an improved bundle unscrambler which feeds bars at an unusually fast rate and more particularly to a bundle unscrambler having an open-type guide above the storage ramp for fast feeding and having ejector arms which move across the path of movement of the bars periodically to eject any interfering bar.

Prior to the present invention bundle unscramblers, such as shown in U.S. Pat. No. 3,506,142, have been used extensively to feed bars from a bundle to a bar feeder, although the rate of feeding of the bars during the automatic cycle usually had to be limited to avoid frequent jamming or malfunction of the machine. It has been a serious problem to provide fully automatic feeding of the bars at a high rate of speed to certain types of high-speed machines, particularly where the bundles were of the common type containing bars which were bent or which tended to cause periodic jamming or disorientation. Severe bending of bars can often occur during lifting of the bundle, for example.

The present invention solves the above problem in a bundle unscrambler by providing a guide member above the inclined storage ramp with a tapered guide surface to facilitate rapid movement of the bars from the bundle to a single row on the ramp and by providing retractable ejector arms to throw a stuck or jammed bar back over the remaining bars of the bundle during lowering of the slings of the unscrambler. Such ejection is preferably effected in each cycle a predetermined period of time (e.g., 1 to 3 seconds) after lowering of the slings is initiated, and the ejected bar is thrown outwardly far enough so that it will not be returned until after other bars are fed to the storage ramp. The ejector arms may have inclined foot portions which throw the bars in the desired manner and which are adjustable to accommodate bars of different sizes.

An object of the present invention is to provide a bundle unscrambler which will provide reliable automatic feeding of bars to a feed or storage ramp at a relatively high rate of speed.

A further object of the invention is to provide a reliable high-speed bundle unscrambler and bar feeder of simple inexpensive construction.

A still further object of the invention is to provide a bundle unscrambler which can continue to feed properly when the bundle contains severely bent bars.

Another object is to provide reliable rapid automatic feeding of bars of widely varying diameter including relatively heavy bars.

Another object of the invention is to provide a novel process of orienting bars in a bundle which is effective with bent or bowed bars and with bars of varying cross section.

These and other objects, uses and advantages of the invention will become apparent to those skilled in the art from the following drawings, description and claims.

In the drawings:

FIG. 1 is a top plan view on a reduced scale of a bundle unscrambler and bar feeder constructed according to this invention;

FIG. 2 is a front elevational view of the apparatus looking in the direction of the arrows 2—2 of FIG. 1;

FIG. 3 is a vertical sectional view taken on the line 3—3 of FIG. 2;

FIG. 4 is a fragmentary vertical sectional view taken on the line 4—4 of FIG. 2 and on a larger scale;

Figure 5:
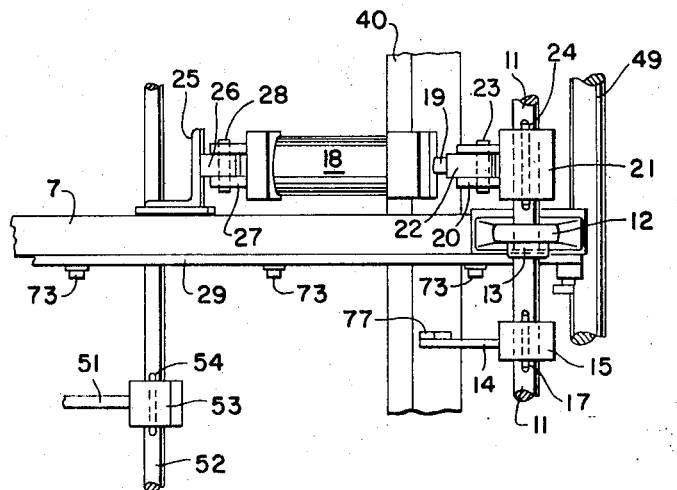
FIG. 5 is a fragmentary top view looking in the direction of the arrows 5—5 in FIG. 4.

Referring more particularly to the drawings, which are drawn substantially to scale and in which like parts are identified by the same numerals throughout the several views, FIGS. 1 to 6 show the apparatus of the present invention including a bar and tube feeder A and an unscrambler B. The bar feeder A is somewhat similar to the feeder disclosed in my U.S. Pat. No. 3,587,822, issued June 28, 1971, and escapes the bars in a similar way.

The unscrambler B is similar to the unscrambler disclosed in my U.S. Pat. No. 3,506,142, issued Apr. 14, 1970, and orients the bars in a similar manner by raising and lowering the slings periodically.

The unscrambler B shown herein has a rigid frame F which includes a pair of horizontal tubular beams 1 and 2 which are welded to a series of front and rear vertical legs 3 and 4. Each front leg 3 is in alignment with a rear leg 4, and these legs are welded to a transverse horizontal tubular beam 5. The upper ends of each pair of front and rear legs 3 and 4 are welded to a vertical feed ramp plate 6 having a flat upper surface 66, and the upper feed-ramp surfaces 66 of the ramp plates are in alignment to engage the bars b and support them in parallel horizontal positions in a row as shown in FIGS. 3 and 4.

Means are provided above the feed ramps 6 for limiting the bars to a single row on the ramps including straight over-hanging cantilever beams 7 which are welded at their ends to vertical supports 8. A horizontal support 9 is welded to the horizontal beam 1 and to each vertical support 8 to carry the weight of the associated cantilever beam 7. The elements 7, 8 and 9 support a series of adjustable vertical guide plates 29 while permitting unobstructed movement of the bars b on the feed ramp 6. These elements also provide a support for a reject arm assembly 10 described in more detail below.

As herein shown, the assembly 10 includes a horizontal reject shaft 11 mounted on a series of axially spaced bearings 13 (see FIG. 5) for turning about a horizontal axis parallel to the sprocket shaft 49 of the unscrambler B and parallel to the escapement shaft 52 of the feeder A. The spaced bearings 13 are held on the frame F by a series of bearing housings 12 which are bolted to or otherwise rigidly connected to the free end portions of the cantilever beams 7. A series of adjustable reject arms 14 are mounted in axially spaced positions on the shaft 11 to turn in unison with the shaft and to engage a bar b on the ramp 6. The arms 14 are located in horizontal alignment with each other so that all of the arms can engage the bar at the same time while the bar is in a horizontal position parallel to the shaft 11. As herein shown, each arm 14 has an internally cylindrical hub portion 15 mounted on the shaft 11 and a key 16 which fits in a keyway slot 17 in said shaft.

Motor means are provided for turning the shaft 11 to cause the arms 14 to throw any bar b remaining on the ramp 6 outwardly over the bundle, for example as indicated generally by the arrow in FIGS. 3 and 4. As herein shown, such motor means comprises a double-acting pneumatic cylinder 18 having a reciprocating piston and a piston rod 19 pivotally connected to an actuating lever 20. The hub portion 21 of the lever 20 is rigidly mounted on the shaft 11 like the arm 14 by means of a key which fits the keyway 24 of the shaft. The end portion of the lever 20 is pivotally connected to the connecting portion 22 of the piston rod 19 by means of a pivot pin 23. At the opposite end of the motor 18, a motor bracket 25 is rigidly mounted on the vertical side face of the associated beam 7 and is provided with a connecting portion 26, which is pivotally connected to the yoke 27 of the motor housing by a horizontal pivot pin 28 (see FIG. 5).

While the reject arm assembly 10 and its motor 18 are usually carried by the frame of the bar feeder A, they function as part of the unscrambling apparatus and can be considered as being part of the unscrambler B. However, in the machine shown herein, the rigid frame G of the unscrambler B is separate from and independent of the reject means at 10. Said frame G is basically the same as disclosed in my U.S. Pat. No. 3,506,142 and may be constructed in an identical manner if desired.

As herein shown, the frame G has a series of front and rear vertical legs 31 and 32, each rear leg being aligned with a front leg and welded to a lateral tubular beam 33 which is welded to the front leg. If desired, a second tubular beam 34 may also be welded to the front and rear legs below the beam 33 to provide added strength. A pair of longitudinal horizontal tubular beams 35 and 36 are welded to the legs 31 and 32 and to the transverse beams 33. The frame G may be rigidly connected to the frame F by suitable means such as lateral bars 47 or the like. Two large pipes 37 are welded to the upper ends of the rear legs 32 with their axes in alignment parallel to the beams 35 and 36 and parallel to the sprocket shaft 49 carried by the front legs 31. Adjustable annular collars 38 are mounted on the pipes 37 to locate the slings 45 of the unscrambler in the desired positions and may be moved axially to different fixed adjusted positions where necessary.

Means are provided above the front legs 31 of the frame G for supporting the horizontal sprocket shaft 49. As herein shown, such means includes flat rectangular metal plates 39 welded in inclined positions on the upper ends of the legs 31. Said plates are in alignment with each other and are welded to a horizontal tubular beam 40, which is parallel to the beams 1, 2, 35 and 36. A bearing holder 41 is rigidly mounted on each plate 39 by bolts 43 to support a bearing 42 for the shaft 49, and said shaft is supported by a series of such bearings 42 for rotation about a horizontal axis parallel to the shaft 11 and the beams 1 and 2. Sling supports or sprocket wheels 44 are rigidly and adjustably mounted on the shaft 49 for rotation in unison therewith and may be moved axially to the desired positions. The shaft 49 is driven by a conventional drive unit 70 which may be of the type disclosed in my U.S. Pat. No. 3,506,142. The slings or chains 45 are mounted on the sprocket wheels 44 and raised and lowered by turning of the sprocket shaft, essentially as disclosed in said U.S. Pat. No. 3,506,142. Thus, a cylindrical member 46 may be provided on a leg 31 for engaging the sling or chain 45 to guide it as it moves upwardly and downwardly, and a suitable limit switch may be provided to indicate when the chain is raised or lowered. For example, one or more limit switches 7LS may be provided and the chain 45 may be provided with one or more special links 128 having cam projections 129 for engaging the cam roller 130 of each limit switch 7LS. This type of arrangement is disclosed in said U.S. Pat. No. 3,506,142. However, a preferred arrangement one or more conventional rotary limit switches which indicate place of the optional limit switch 7LS, the position of the slings 45 in response to rotation of the shaft 49. As herein shown, the sprocket shaft 49 is provided with two rotary limit switches 1RLS and 2RLS. The electrical control circuit is shown diagrammatically in FIG. 8.

The bundle of bars b may be loaded onto the transverse beams 33 by means of a lift truck, hoist or crane. The unscrambler B shown herein is constructed in such a way that a large diameter circular magnet, capable of lifting a bundle with a weight of 5 or 10 tons, may be lowered between the beams 35 and 36 at the center of the frame G. The pipes 37 are separated to provide a clearance space for this purpose.

It is preferable to provide means on the beams 33 for assisting in orienting the bars. As shown, a plurality of inverted V-shaped steel members 48 are welded to the central portion of each beam 33 for engaging the bars b of the bundle. The members 48 are provided on at least two of the beams 33 and are in alignment in a longitudinal direction. One to three members 48 in the form of a steel angle or the like may be provided on each beam 33, two usually being preferred.

As herein shown, the bar feeder A has an escapement mechanism 50 similar to that disclosed in my U.S. Pat. No. 3,587,822 which may, if desired, be exactly the same as that described in that patent. The escapement mechanism 50 has a series of axially spaced escapement arms 51 rigidly mounted on a horizontal escapement shaft 52 parallel to the shaft 49. Each arm has a hub portion 53 which is connected to the shaft by means of a key 55 which fits a keyway 54 of the shaft. The shaft is turned by a conventional pneumatic motor 56 having a piston rod 57 with a bifurcated connecting portion 58 pivotally connected to one of the escapement arms 51 by a pivot pin 59. The lower end of the motor housing has a yoke portion 60 which is pivotally connected to the horizontal beam 1 of the frame F by a pivot pin 61 and a lug or bracket 26 welded to said beam (see FIG. 4).

Each arm 51 has a triangular upwardly projecting end portion 64 and has adjustable means for supporting an escapement member 65 having a triangular upwardly projecting portion 67 for engaging a bar b to lift it over the stop bar 63 at the end of the feed ramp 6. The stop bar projects above the upper surface 66 of the ramp to engage the lowermost bar on the ramp and stop rolling of the row of bars down the ramp. As shown, each member 65 has two parallel inclined slots 68 of a size to receive two clamping screws 69 which screw into the arm 51. The slots 68 of each bar are parallel to the flat inclined upper surfaces of the triangular portions 64 and 67 and permit adjustment of the members 65 to a position wherein said triangular portions combine to provide a wide bar-engaging area as needed for lifting and feeding large bars. The triangular portions 64 are located so that they do not interfere with the adjustment of the members 65 for feeding of small diameter bars. The construction and functioning of the escapement arms 51 may be essentially as disclosed in my U.S. Pat. No. 3,587,822 so that one bar is removed from the feed ramp and fed to the stock carriers or trough at 71 each time the escapement motor 56 is operated to lift the arms 51.

FIG. 4 shows the equipment adjusted to handle small diameter bars b, the flat lower surfaces 99 of the guide plates 29 being located in a plane parallel to the plane containing the flat upper surfaces 66 of the feed ramp plates 6 and spaced therefrom a distance slightly greater than the diameter of said small diameter bars. Various means may be provided to effect such adjustment. As herein shown, each guide plate 29 has vertically elongated slots 72 which receive clamping screws 73 that screw into the beams 7.

At the entrance end of the feed ramp, each guide plate 29 has a beveled bar-engaging surface 74 to guide each bar toward the ramp and to facilitate rapid feeding of the bars onto the feed ramp at 6. The surface 74 may be curved somewhat but is usually substantially flat and is inclined about 20° to about 60° and preferably about 30° to about 50° relative to the surface 99. The axially spaced plates 29 are in alignment with each other so that the surfaces 74 are in a common plane parallel to the sprocket shaft 49 when the surfaces 99 are located in one plane.

At the discharge end of the feed ramp, means may be provided to prevent upward movement of small diameter bars away from the ramp as the lowermost bar is lifted over the stop 63. As herein shown, each plate 29 supports a small rectangular guide plate 30 by means of two clamping screws 75 which screw into the plate 29. The screws fit in narrow longitudinal adjusting slots 76 of the plate 30 and permit an adjustment of said plate from a projecting position for small bars b as shown in FIG. 4 to a retracted position for larger bars. In the projecting position, the plate 30 allows upward movement of the lowermost bar b on the ramp but prevents upward movement of the next adjacent bar b while the arms 51 are being raised. The plate 30 assures proper operation of the escapement mechanism 50 when the machine is operated at high speed with lightweight or small diameter bars, but may not be needed for heavier bars.

Limit switches may be provided to indicate the presence of bars on the feed ramp or to control feeding of the bars b as disclosed, for example, in said U.S. Pat. No. 3,506,142. It is usualy desirable to provide a conventional bank control to stop operation of the bundle feeder when the feed ramp is full or when it contains the desired number of bars. As herein shown, a conventional limit switch 6LS is mounted on one of the feed plates 6 for this purpose and has an acutator 95 which projects above the upper surface 66 of the plate to engage each bar that rolls down the feed ramp (see FIG. 4). The switch may be adjustably mounted so that it can be moved to different fixed positions along the length of the ramp 6 and clamped in a position to provide the desired number of bars on the ramp.

One or more limit switches may be provided at the entrance end of the storage ramp at 6. As herein shown, a pair of conventional limit switches 3LS and 4LS of identical construction are provided on the bar feeder A for indicating movement of a bar onto the ramp. These are spaced apart a substantial distance axially and may be located near opposite ends of the machine. One of such limit switches may be adequate, but a second switch is preferable to assure proper operation at all times. Each of the switches has an acutator 94 extending above the surface 66 for engaging a bar b at the end of the ramp 6.

A limit switch 5LS is provided which opens when the reject arms 14 move forward. Such switch is of conventional construction and may be arranged to open in response to operation of the motor 18 or in response to rotation of the shaft 11 (like the switch 2RLS).

The escapement mechanism 50 of the bar feeder A is designed for high-speed feeding of the bars b one at a time to a conveyor or to a discharge ramp or storage device. The conveyor may remove the bar b in the lateral direction parallel to the direction of movement on the feed ramp plates 6 or in the axial direction. The conveyor may be a chain conveyor as disclosed in said U.S. Pat. No. 3,506,142 or in said U.S. Pat. No. 3,587,822 or may be a simple channel or trough. As herein shown, a horizontal trough 71 of uniform V-shaped cross section is rigidly mounted on the frame F and serves as a stock carrier to receive each bar b discharged from the feed ramp by the escapement mechanism 50, and a conventional pinch-roll drive assembly 80 is provided for engaging a central portion of a bar b to feed it axially out of the trough. The trough or stock carrier 71 is made in two sections which are spaced apart axially to permit each bar b to engage the upper and lower pinch rolls 81 and 82 while it rests at the bottom of the trough. The discharge end of the trough is located adjacent the conventional pinch roll drive 90 of an automatic machine C, such as a lathe, grinder or cut-off machine, so that the bar b is fed directly between the upper and lower rolls 91 and 92.

The pinch-roll drive means employed on the bar feeder A may employ hold down rollers of the type disclosed in said U.S. Pat. No. 3,587,822 or various other conventional drive means which grips and releases the bar to effect the desired periodic feeding in concert with operation of the escapment means 50. Such periodic feeding is well known and forms no part of the present invention.

As herein shown, the pinch roll drive assembly 80 has a drive motor 84 with a drive sprocket 85 which drives a sprocket chain 86 to effect driving of both of the pinch rolls 81 and 82. A housing 83 encloses the assembly and is rigidly supported by portions of the frame F including the vertical front leg 3a. The lower roll 82 is rigidly supported in a fixed adjusted position for driving engagement with the bottom of the bar b in the trough 71 while the upper roll 81 is mounted on a vertically swinging arm 87 to move into and out of driving engagement with the bar b. The roll 81 is raised once in each cycle to permit feeding of a bar b from the feed ramp to the trough and is then lowered against such bar to feed it axially out of the trough.

The bar feeder A, its escapement mechanism and the bndle feeder B may be operated in proper sequence with operation of the machine C as will be apparent to those skilled in the art. Thus, the electrical controls of the bar feeder are normally interconnected with those of the lathe or other machine C to provide the desired operation (see, for example, U.S. Pat. No. 3,480,159 and U.S. Pat. No. 3,493,125).

FIG. 11 is a schematic electrical diagram illustrating one type of automatic control system which may be employed with the equipment shown in FIGS. 1 to 9. In general, the graphic symbols and basic device designations employed in the diagram are in accordance with the electrical standards of the Joint Industrial Council as set forth in the April and May, 1967 issues of "Electro-Technology." Thus, the lines of the circuit diagram are numbered at the left of FIG. 11 and are identified by these numbers in the description below.

Manual controls may be provided in addition to the automatic controls for set-up purposes or short runs. As herein shown, manual operation is effected by moving the three-position selector switch SS-1 to the "MAN." position and controlling the operations by means of the three-position selector switch SS-2 and the push buttons PB1 and PB2.

Automatic operation is effected by moving the selector switches SS-1 and SS-2 to the "AUTO" position to close their contacts in line 2. Assuming that the storage ramp at 6 is not full and that the reject arms 14 are in their uppermost retracted positions, the switch 5LS on the reject arm shaft 11 will be closed, bank control switch 6LS will be in its normal closed position and relay 11TR line 8 will be energized. Thus, the switch 11TR of line 2 will be closed. Assuming that the slings 45 are below their uppermost position, the rotary limit switch 1RLS on the sprocket shaft 49 will be closed. Limit switches 3LS and 4LS are in their normal closed positions at this time so that the relay 1MR is energized upon closing of the SS-1 and SS-2 contacts in line 2. The normally open 1MR switches in the motor circuit are then closed to operate the motor 1MTR of the drive unit 70 in a direction to raise the slings 45.

If there are no bars remaining on the slings 45, the switch 1RLS will open when the slings arrive at their uppermost positions to deenergize the relay 1MR and the motor 1MTR. If bars are present on the slings, some of them will move over the sprockets 44 to the feed ramp 6 as the slings are raised. One of the bars will engage the normally closed limit switches 3LS and/or 4LS to open such switches momentarily in line 2 and close them momentarily in lines 3 and/or 4, thereby deenergizing relay 1MR in line 2, reclosing switch 1MR in line 4, and energizing relay 1ML in line 4. A holding circuit is provided by normally open switch 1ML in line 6 to energize timer relay 13TR in line 5, to maintain relay 1ML energized, and to keep switch 1ML open in line 2 so that the relay 1MR is deenergized. The normally open switches 1MR of the motor circuit are then closed to cause operation of the motor 1MTR in a direction to lower the slings 45. After a time delay of 2 to 3 seconds after energizing the relay 13TR, the switch 13TR closes in line 9 to energize solenoid 3SOL, thereby causing the piston of the reject motor 18 to operate in a direction to swing the reject arms 14 downwardly and forwardly to their forward positions where they are held until the reject motor 18 is reversed.

The normally closed switch 5LS mounted on the reject arm shaft 11 is opened in response to such forward movement of the reject arms 14 and is held in the open position until the arms are retracted.

When the slings 45 arrive at the lower position, the rotary limit switch 2RLS mounted on the sprocket shaft 49 opens to deenergize relay 1ML in line 4 and open switch 1ML in line 6, thereby deenergizing the timer relay 13TR in line 5 and opening the switch 13TR in line 9 to deenergize the solenoid 3SOL. The reject motor 18 then causes the reject arms 14 to return to their upper retracted positions shown in solid lines in FIG. 4. This closes the limit switch 5LS to start another cycle.

During each cycle the slings 45 are raised to discharge bars b onto the feed ramp, the reject arms 14 are advanced a few seconds after lowering of the slings is initiated, and said reject arms are retracted before the slings are raised to discharge more bars.

Each time the bars b roll down the feed ramp, they momentarily open the normally closed bank control switch 6LS to deenergize the relay 11TR. However, the switch 6LS closes as soon as the bars roll past to reenergize the relay. The switch 11TR in line 2 is constructed to open about 3 seconds after the relay 11TR is deenergized and to close immediately when said relay is energized. Therefore, the switch 11TR remains closed until such time as the limit switch 6LS is held open more than 3 seconds — that is, until the ramp is full up to that switch. When the ramp is full, the switch 11TR if open in line 2 and the operation of the machine is halted until more bars are removed from the feed ramp to the conveyor to permit switch 6LS to close. The position of the switch 6LS along the length of the feed ramp determines the number of bars b on the ramp, and such position may be adjusted, if desired.

Figure 8:
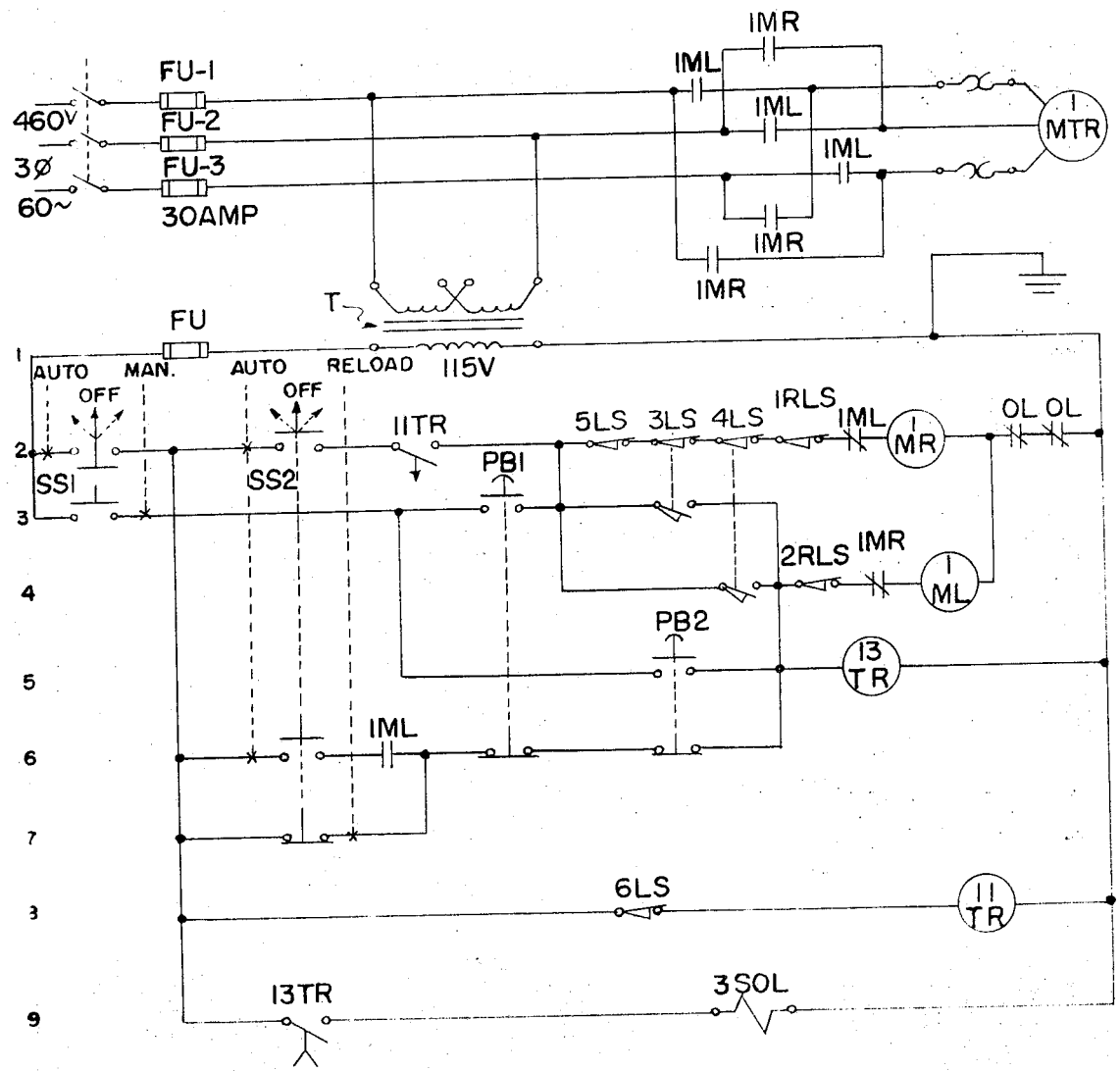
FIG. 8 is a dragrammatic view showing the electrical control circuit.

The sequence of operations performed automatically by the electrical equipment of FIG. 8 may also be performed manually in almost the same way and, if desired, the various limit switches can be employed to energize ready lights, horns or other indicating devices to facilitate the manual operation. The process and apparatus may also be modified and elements or procedures modified or adjusted for optimum results. Adjustments are more easily made when the process of this invention is performed manually, but it will be apparent that the equipment may also be adjustable.

If, for example, it becomes necessary or desirable to reduce the time required for raising and lowering the slings of the unscrambler B or to increase the frequency of the unscrambling cycle, the process can be modified by increasing the speed of drive unit 70 during lowering of the bundle or reducing the distance the bundle is lowered during each unscrambling cycle. The drive unit 70 may also be controlled to increase the speed during the initial lifting of the bundle or until the slings are about high enough to deliver bars to the ramp, at which time the speed may be reduced. The bundle need not be raised and lowered at a constant speed, but the speed should be controlled to provide the proper unscrambling action.

When the machine is operated with bars which are substantially straight and well oriented, it may be possible to increase the speed of operation or the frequency of the unscrambling operations by reducing the distance the slings are lowered during each cycle, for example by adjusting the rotary limit switches 1RLS and/or 2RLS. If the process is modified in this manner, it may be desirable to raise the members 48 so that they engage the bundle when it is lowered or to lower the bundle against the members 48 in those instances where the reject arms 14 engage an interfering bar. The latter process would provide partial lowering of the slings during normal operation and full lowering of such slings only when it appeared necessary to orient the bars in the most effective manner. Partial lowering of the slings would also permit more frequent reversals in the unscrambler and might be desirable where the feed rate to the storage ramp 6 has to be relatively low, such as 3 to 4 bars per cycle.

In carrying out the process of the present invention, various means may be employed to eject an interfering bar. As herein shown, a series of reject arms 14 are employed which are mounted to swing about a common horizontal axis, but it will be apparent that the ejecting motion could be generally linear or elliptical rather than circular and that the shape and movement of the ejecting means could vary substantially and still eject the interfering bar generally in the desired manner or along the desired path. A plurality of reject arms 14 are mounted on the shaft 11, and it is preferable to employ a series of such arms. The number of such arms is preferably at least three and may be four to 10 or more. They may be regularly spaced or arranged to handle both long and short bars $b$.

The reject arms 14 may have a radial length of 3 inches to 20 inches or more and preferably have a radial length of about 5 to about 15 inches measured from the central axis of the shaft 11. Said axis is spaced from the plane containing upper surfaces 66 of the ramp plates 6 a distance which may be about one-half inch to about 1 ½ inches less than the radial length of the arm 14 so that the end portion of the arm extends a small distance below said plane as it moves from its retracted to its advanced position.

Figure 6:
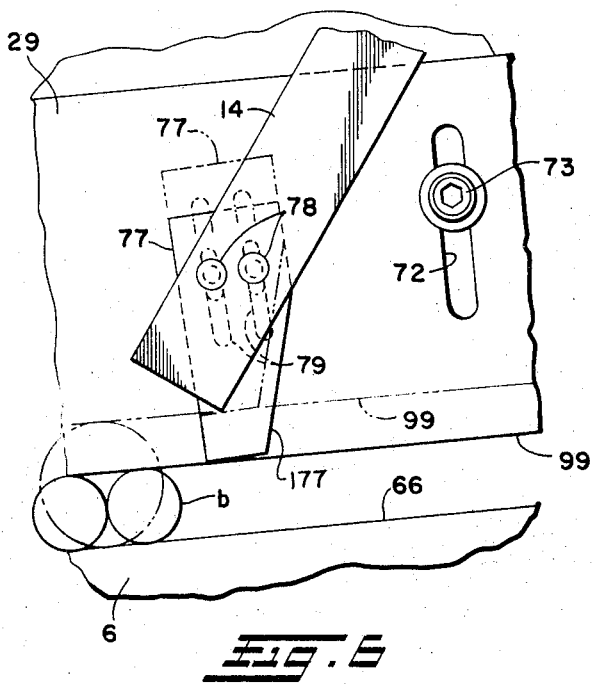
FIG. 6 is a fragmentary elevational view showing details of the apparatus on a larger scale.
Figure 7:
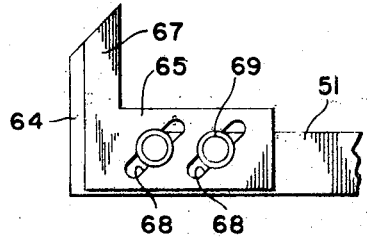
FIG. 7 is a fragmentary view of the escapement device.

As herein shown, the arms 14 have bar-engaging foot portions in the form of trapezoidal plates 77 which are rigidly connected to the free ends of the arms by clamping screws or bolts 78. The foot portions 77 are preferably mounted for adjustment toward and away from the feed ramp at 6. As shown in FIG. 6, each plate 77 has a pair of narrow adjusting slots 79 of a size to receive the screws 78, which slots are parallel and elongated in a direction almost perpendicular to the plane containing the surfaces 66. This permits adjustment of the plate 77 from the position shown in solid lines in FIG. 6 (for small diameter bars) to the position shown in broken lines in that figure (for large diameter bars).

The foot portions 77 of the reject arms have inclined bar-engaging surfaces 177 which provide means for imparting lift to any interfering bar $b$ and for causing such bar to be thrown upwardly and outwardly over the remaining bars of the bundle, for example, as indicated in dot-dash lines by the arrow in FIG. 3. Each of the surfacea 177 may be flat or concave and is preferably inclined at a small angle (e.g., about 20° to 45°) relative to the centerline or line of action of its associated arm 14 to provide the desired lift. The surfaces 177 are in alignment with each other and in a plane parallel to the shaft 11 when the arms 14 are properly aligned and adjusted for a given bar diameter.

A machine of the type shown in the drawings may, for example, be adjusted to handle bars $b$ with a diameter of about 0.2 inch to about 2.5 inches and a length of about 3 feet to about 25 feet. Such machine is usually employed to handle solid or hollow bars $b$ with a diameter in the range of about 0.3 inch to about 1.5 inches and a length of 5 to 20 feet.

Each reject arm 14 and its associated foot portion 77 are designed to function with bars of widely varying diameter. During each cycle, the bar-engaging surface 177 remains in the path of movement of the bars (between the planes of the surfaces 66 and 99) during a substantial angular movement of the arm 14 (e.g., 40° to 90° or more). During such angular movement the foot portion 77 moves a distance along the ramp surface 66 which is usually in the range of about 4 inches to about 1 foot and preferably not substantially greater than the radial length of the arm 14.

The foot portion 77 is preferably of such size that it can function properly with bars of different diameter (e.g., a diameter of three-eighths inch to three-fourths inch) without adjustment, and, therefore, the part of the surface of each foot portion 77 that is located to engage a bar $b$ between the surfaces 66 and 99 (i.e., the exposed bar-engaging surface 177) has a length which is preferably about 1 inch to about 2.5 inches.

The arms 14 should be located adjacent the inlet end portion 96 of the ramp 6 and close enough to the sprocket wheels 44 to throw an interfering bar b a substantial distance over the bundle or a distance such that such bar will not be the first bar returned to the feed ramp the next time the slings 45 are raised. For this reason the axis of shaft 11 is not far from the vertical plane containing the axis of the sprocket shaft 49 and is usually no more than 8 inches from said plane. The surface 66 of the feed ramp plate 6 preferably extends to within a few inches of said vertical plane as indicated, for example, in FIG. 4, and the inclined guide surface 74 is preferably located a short distance (e.g., 1 to 6 inches) from the end of the feed ramp.

Each reject arm 14 is preferably arranged to swing from a retracted position (as shown, for example, in solid lines in FIG. 4) wherein the foot portion 77 is above the plane of the guide surfaces 99 to an advanced position (as shown, for example, in dot-dash lines in FIG. 4) wherein the foot portion 77 extends 1 to 8 inches beyond the vertical plane containing the axis of the sprocket shaft 49. When the reject arm is in its retracted position, it is usually inclined 20° to 50° relative to the vertical and its foot portion 77 is usually spaced 2 to 8 inches from the inclined guide surface 74 (see FIG. 4). When the arm is in its advanced position as shown in broken lines in FIG. 3, for example, it is usually inclined in the opposite direction about 20° to 80° relative to the vertical and usually extends 2 to 8 inches beyond the surface 74 and near or beyond the vertical plane containing the axis of the sprocket shaft 49.

The advanced position of the arm 14 may be adjusted in various ways, as by use of adjustable stops, by varying the position or stroke of the motor 18, the size or location of the lever 20, and/or the setting of the limit switch 5LS. Such advanced position should be selected to provide the desired lifting action and to permit throwing of an interfering bar a sufficient distance across the bundle. It is usually desirable to adjust the equipment so that the foot portions 77 will impart lift to the interfering bar $b$ as it is being ejected and will cause it to move upwardly a total distance of 1 to 10 inches or so as it is thrown over the remaining bars $b$ on the slings 45.

The motor 18 is constructed to operate at a speed sufficient to throw the interfering bar $b$ a horizontal distance of at least 8 inches and usually in the range of about 1 to 4 feet. The ejected bar may be thrown to the side of the bundle remote from the feed ramp and is preferably thrown at least about halfway across the bundle and at least about half the distance from the rotating sling supports 44 to the fixed sling supports 38. The drive motor for the shaft 11 may be of a variable speed type or may be adjusted to effect throwing of the interfering bar in the desired manner by the reject arms.

In performing the process of the present invention, one can vary the speed of the reject drive motor for shaft 11 and can also initiate operation of such motor at somewhat different times during the cycle. For example, the reject motor can be energized 1 to 5 seconds or more after lowering of the slings is initiated provided that the reject arms 14 are moved before the slings return to a bar-feeding position. The reject arms are preferably operated within a few seconds after lowering of the slings is initiated and before the slings reach their lowered positions.

The process may, for example, be performed in such a manner that the arms 14 move faaster or throw an interfering bar b farther where there is a large bundle of bars on the slings than they do when there are fewer bars remaining on the bundle. This result can be achieved, for example, by controlling the speed or torque of the drive motor for shaft 11 in response to the position of the slings 45 at the time switch 3LS is actuated since the latter position generally indicates the number of remaining bars. A similar result could also be achieved by reducing the speed of the reject drive motor when more time is required in a cycle to lower and raise the slings. This is true because less time will ordinarily be required when the bundle of bars b is large. However, it may also be feasible to increase the speed of movement of the slings or to reduce the amount of vertical movement when there are few bars remaining.

It will be understood that, in accordance with the provisions of the patent laws, variations and modifications of the specific methods and devices disclosed herein may be made without departing from the spirit of the present invention.

Having described my invention, I claim:

1. In an apparatus for unscrambling a bundle of parallel bars comprising a rigid frame having portions spaced apart to receive said bundle and to permit vertical movement thereof, spaced flexible slings for supporting the bundle, sling supports mounted on the opposite side of the frame for supporting the slings to provide festoons for supporting the bundle of bars, a ramp adjacent said sling supports, driving means for moving each sling upwardly from its festoon over its associated sling support to shorten and raise said festoon and to feed a bar from said bundle to said ramp, said driving means being operable to effect raising of the bundle and also being operable to move each sling in the opposite direction to lower the bundle, and means for periodically reversing said driving means to cause raising and lowering of said slings, whereby the bars are oriented in the bundle, the improvement which comprises bar-engaging guide means above the inlet end portion of said feed ramp and spaced therefrom to provide an unobstructed path of movement with a height greater than the diameter of said bars and less than twice said diameter to assure formation of no more than one row of bars on said ramp, said guide means having a bar-engaging surface inclined in a direction to guide each bar toward the ramp so as to facilitate feeding of the bars to the ramp at a rapid rate, and means for ejecting any interfering bar remaining adjacent said inlet end portion after raising of the slings is discontinued to clear said path and for throwing such bar over the bundle to the other side thereof while the slings are being lowered so that any such interfering bar will not be returned to said ramp until after other of the remaining bars of the bundle are fed to the ramp, said last-named means including a plurality of pivoted ejector arms mounted to swing vertically from retracted positions out of said path of movement of the bars on said ramp to bar-engaging positions, and motor means for periodically moving said arms to effect ejection and to clear said path of any such interfering bar, each of said ejector arms having a bar-engaging foot portion to assist in throwing the bar over the bundle during such ejection.

2. Apparatus as defined in claim 1 wherein means are provided to initiate operation of said motor means during each cycle of operation a predetermined period of time after lowering of the slings is initiated by said driving means.

3. In an apparatus for unscrambling a bundle of parallel bars comprising a rigid frame having portions spaced apart to receive said bundle and to permit vertical movement thereof, spaced flexible slings for supporting the bundle, sling supports mounted on the opposite side of the frame for supporting the slings to provide festoons for supporting the bundle of bars, a ramp adjacent said sling supports, driving means for moving each sling upwardly from its festoon over its associated sling support to shorten and raise said festoon and to feed a bar from said bundle to said ramp, said driving means being operable to effect raising of the bundle and also being operable to move each sling in the opposite direction to lower the bundle, and means for periodically reversing said driving means to cause raising and lowering of said slings, whereby the bars are oriented in the bundle, the improvement which comprises bar-engaging guide means above the inlet end portion of said feed ramp and spaced therefrom to provide an unobstructed path of movement with a height greater than the diameter of said bars and less than twice said diameter to assure formation of no more than one row of bars on said ramp, said guide means having a bar-engaging surface inclined in a direction to guide each bar toward the ramp so as to facilitate feeding of the bars to the ramp at a rapid rate, and means for ejecting any interfering bar remaining adjacent said inlet end portion after raising of the slings is discontinued to clear said path and for throwing such bar over the bundle while the slings are being lowered so that any such interfering bar will not be returned to said ramp until after other of the remaining bars of the bundle are fed to the ramp, said last-named means including a plurality of ejector arms mounted to swing vertically from retracted positions out of said path of movement of the bars on said ramp to bar-engaging positions, and motor means for periodically moving said arms to effect ejection and to clear said path of any such interfering bar, each of said ejector arms having a foot portion with an inclined bar-engaging surface to impart lift to a bar as it is ejected.

4. Apparatus as defined in claim 3 wherein each foot portion is adjustably mounted on its associated ejector arm to facilitate operation with bars of different diameters.

5. Apparatus as defined in claim 4 wherein said guide means is mounted for adjustment toward and away from said ramp to accommodate bars of different diameter.

6. Apparatus as defined in claim 1 wherein there are provided means responsive to movement of a bar toward said ramp for automatically reversing said driving means to lower the slings and means for initiating operation of said motor means a predetermined period of time later to effect ejecting movement of said arms while the slings are being lowered.

7. Apparatus as defined in claim 6 wherein the means for reversing said driving means includes a switch means mounted in the path of movement of a bar on said ramp.

8. Apparatus as defined in claim 7 wherein said means for reversing said driving means provides a sufficient delay to permit feeding of a series of bars to the storage ramp each time the slings are raised.

9. Apparatus as defined in claim 7 wherein said switch means is located near the entrance portion of the storage ramp.

10. A process for feeding hollow or solid bars to a bar storage ramp of a bar feeder having conveying means to receive bars periodically fed from said ramp, said process comprising supporting a bundle of said bars in generally parallel relation on spaced slings, causing said slings to move over sling supports located near the entrance end of the storage ramp while supporting the ends of the slings remote from said ramp to provide festoons extending under the bundle to support the same, raising the bars by moving the slings up over the sling supports to cause some of the bars to move upwardly and over the sling supports to said ramp, reversing the direction of movement of the slings over said sling supports to lower the bars after some of said bars move laterally onto said ramp, thereafter causing said slings to raise the remaining bars of said bundle as before to feed additional bars to said ramp, and continuing to raise and lower the slings to maintain a supply of bars on said ramp and to orient the bars on said slings, characterized in that inclined guide means are supported above the inlet end portion of said feed ramp and spaced therefrom to provide an unobstructed space with a height greater than the diameter of said bars and less than twice said diameter to assure formation of no more than one row of bars on said ramp, and in that any bar remaining adjacent said inlet end portion after the bars are fed to the ramp by raising the slings is ejected while the slings are being lowered and is thrown upwardly and outwardly over the bundle in such manner that it will not be returned to said ramp until after other bars are fed to the storage ramp.

11. A process as defined in claim 10 wherein such ejection is effected in each cycle a predetermined period of time after lowering of the slings is initiated and before the slings are again raised.

12. A process as defined in claim 11 wherein said predetermined period is about 1 to about 3 seconds.

13. A process as defined in claim 1 wherein the ejected bar is thrown a horizontal distance of at least 8 inches.

14. A process as defined in claim 10 wherein the ejected bar is throw to the side of the bundle remote from said ramp.

15. A process as defined in claim 10 wherein three to eight bars are fed to the ramp each time the slings are raised.

16. A process as defined in claim 10 wherein such ejection is effected by a plurality of pivoted eject arms having retracted positions out of the path of movement of bars moving onto said ramp and having advanced positions in said path.

17. In a process for feeding hollow or solid bars to a bar storage ramp of a bar feeder having conveying means to receive bars periodically fed from said ramp, said process comprising supporting a bundle of said bars in generally parallel relation on spaced slings, causing said slings to move over sling supports located near the entrance end of the storage ramp while supporting the ends of the slings remote from said ramp to provide festoons extending under the bundle to support the same, raising the bars by moving the slings up over the sling supports to cause some of the bars to move upwardly and over the sling supports to said ramp, reversing the direction of movement of the slings over said sling supports to lower the bars after some of said bars move laterally onto said ramp, thereafter causing said slings to raise the remaining bars of said bundle as before to feed additional bars to said ramp, and continuing to raise and lower the slings to maintain a supply of bars on said ramp and to orient the bars on said slings, characterized in that inclined guide means are supported above the inlet end portion of said feed ramp and spaced therefrom to provide an unobstructed space with a height greater than the diameter of said bars and less than twice said diameter to assure formation of no more than one row of bars on said ramp, and in that any bar remaining adjacent said inlet end portion after the bars are fed to the ramp by raising the slings is ejected while the slings are being lowered and is thrown over the bundle in such manner that it will not be returned to said ramp until after other bars are fed to the storage ramp, such ejection being effected by a plurality of pivoted eject arms having retracted positions out of the path of movement of bars moving onto said ramp and having advanced positions in said path, each of said eject arms having a bar-engaging foot portion to assist in throwing the bar over the bundle during each ejection. guide means are supported above the inlet portion of said feed ramp and spaced therefrom to provide an unobstructed space with a height greater than the diameter of said bars and less than twice said diameter to assure formation of no more than one row of bars on said ramp, and in that any bar remaining adjacent said inlet end portion after the bars are fed to the ramp by raising the slings is ejected while the slings are being lowered and is thrown over the bundle in such manner that it will not be returned to said ramp until after other bars are fed to the storage ramp, such ejection being effected by a plurality of pivoted eject arms having retracted positions out of the path of movement of bars moving onto said ramp and having advanced positions in said path, each of said eject arms having a bar-engaging foot portion to assist in throwing the bar over the bundle during each ejection.

18. A process as defined in claim 10 wherein said bar remaining adjacent said inlet end portion is ejected and thrown a horizontal distance of at least 1 foot while being caused to move upwardly about 1 to 10 inches.

19. A process as defined in claim 18 wherein said last-named bar is thrown at least halfway across the bundle and caused to move to the side of the bundle remote from the feed ramp.

20. A process as defined in claim 18 wherein said last-named bar is thrown at least about half the distance from said sling supports to the supported ends of the slings remote from said ramp.

21. A process as defined in claim 10 wherein said bar remaining adjacent said inlet end portion is ejected and thrown over all of the bars remaining on the slings.

22. Apparatus as defined in claim 1 wherein the foot portion of each pivoted arm remains in the path of movement of the bars while it moves at least 4 inches along the ramp and while it swings at least 40° to an upwardly inclined position.

23. Apparatus as defined in claim 22 wherein each arm has a radial length of about 5 to about 15 inches.

24. Apparatus as defined in claim 1 wherein each ejector arm in its retracted position is inclined 20° to 50° relative to the vertical and is spaced 2 to 8 inches from said inclined bar-engaging surface of said guide means and wherein each ejector arm in its advanced position is inclined in the opposite direction 20° to 80° relative to the vertical and extends 2 to 8 inches beyond said last-named bar-engaging surface.

* * * * *

PO-1050
(5/69)

UNITED STATES PATENT OFFICE
CERTIFICATE OF CORRECTION

Patent No. 3,774,779            Dated November 27, 1973

Inventor(s) Frank F. White

It is certified that error appears in the above-identified patent and that said Letters Patent are hereby corrected as shown below:

Column 13, line 54, for the claim reference numeral "1" should read --10-- in the first line of claim 13.

Column 13, line 58, "throw" should read --thrown--.

Column 14, line 38, after "each ejection" insert a period (.) and cancel the remainder of claim 17 through line 55.

Signed and sealed this 2nd day of April 1974.

(SEAL)
Attest:

EDWARD M. FLETCHER, JR.            C. MARSHALL DANN
Attesting Officer                     Commissioner of Patents